Feb. 24, 1970

H. J. GERBER 3,497,778

PART POSITIONING DEVICE AND PLURAL STEPPING
MOTOR CONTROL THEREFOR

Filed April 17, 1967

INVENTOR.
HEINZ JOSEPH GERBER

BY

McCormick, Paulding & Huber

ATTORNEYS

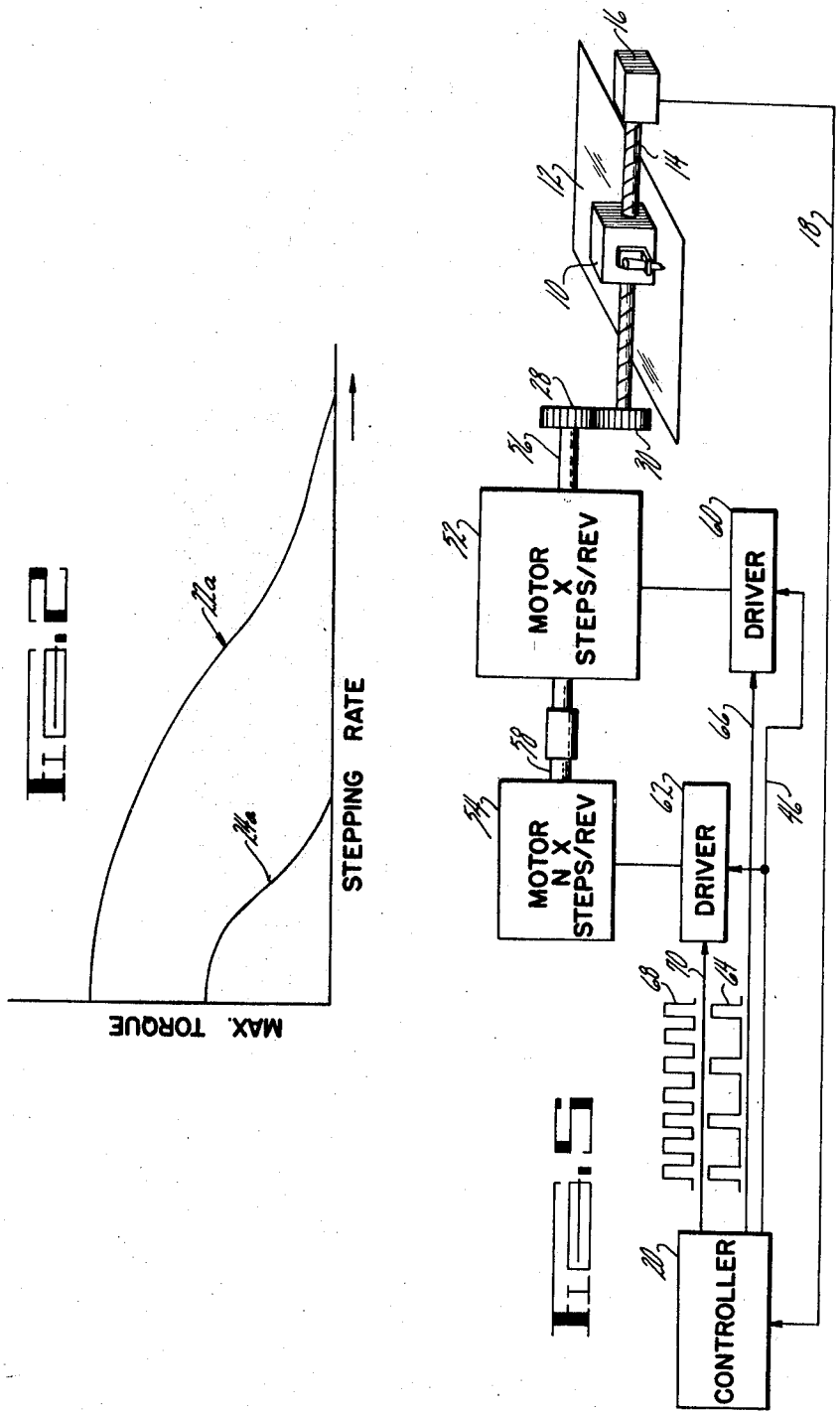

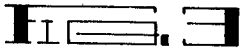
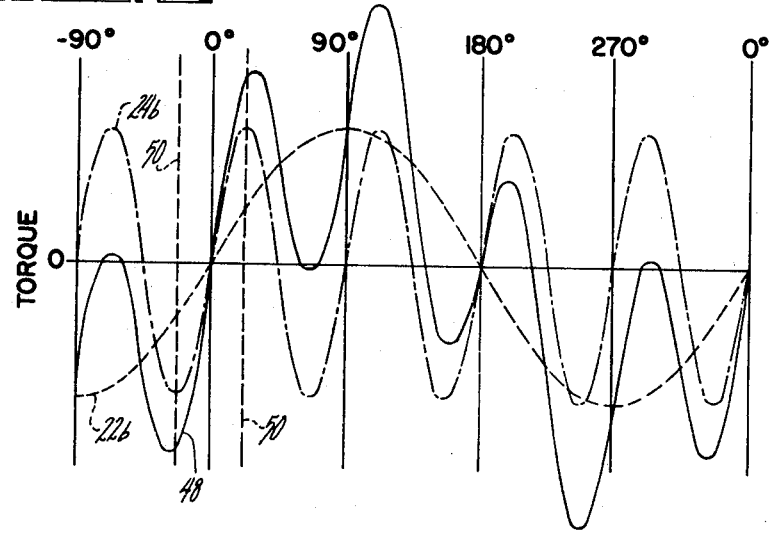
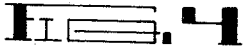
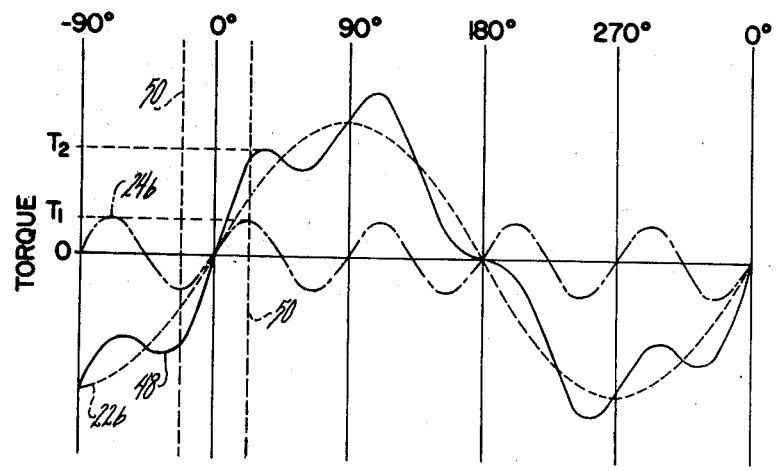

United States Patent Office 3,497,778
Patented Feb. 24, 1970

3,497,778
PART POSITIONING DEVICE AND PLURAL STEPPING MOTOR CONTROL THEREFOR
Heinz Joseph Gerber, West Hartford, Conn., assignor to The Gerber Scientific Instrument Company, South Windsor, Conn., a corporation of Connecticut
Filed Apr. 17, 1967, Ser. No. 631,535
Int. Cl. H02p 7/08; H02k 7/10
U.S. Cl. 318—8     10 Claims

ABSTRACT OF THE DISCLOSURE

The disclosure is of a device for positioning a part, such as the pen of a plotter or the tool of a machine tool, relative to a piece of paper, workpiece or other reference member and of a multiple motor drive system for use with such a device. The multiple motor drive system comprises two or more electrical motors of the impulse or stepping variety which are mechanically coupled to a single drive shaft and driven in unison. The speed reduction ratios between each motor and the drive shaft, and the construction of the motors, is such that the motors have different degrees of stiffness as reflected to the drive shaft. A motor with high reflected stiffness controls the positioning of the drive shaft at low drive shaft speeds and a motor with lower reflected stiffness provides power for driving the drive shaft at high speeds.

BACKGROUND OF THE INVENTION

This invention relates to plotters, machine tools, and other devices requiring precise movement of a part between various positions relative to a given reference member. More particularly, it relates to a motor system especially useful in such a part positioning device and involving a combination of motors for driving a single output shaft.

The type of devices with which this invention is especially concerned are those, sometimes referred to as linear positioning devices, wherein the moved part performs an operation while moving along a line relative to the reference member, as for example drawing a line on a piece of paper in the case of a plotter. The line along which the part is moved may be broken down into a number of short straight line segments with the part being moved in sequence from the end point of one segment to the end point of the next segment and so on, but to obtain a high degree of precision in the overall operation it is necessary that the part not only be moved so as to locate precisely each end point but is also necessary that in traversing each line segment that it closely follow such segment. Normally, the part is stopped or at least slowed down at each end point so that in traversing a line segment the part is first accelerated at the beginning of the segment and then decelerated at the end of the segment. This acceleration and deceleration imposes a requirement for relatively high driving torque at low speeds, and in order to maintain precision the drive system which supplies this torque should be capable of faithfully responding to input commands with little error, slop, overshoot or vibration. On the other hand the drive system should also be able to drive the part at relatively high speeds to minimize the time required for performing a given operation. In the past, however, some compromise between precision and maximum speed has been necessary, at least in stepping motor drive systems, since available stepping motors have a speed versus torque characteristic such that the torque decreases with increases in speed. Therefore, a motor geared to produce optimum torque and precision at low speeds is generally incapable of operating at a satisfactory high speed.

SUMMARY OF THE INVENTION

The invention resides in a part positioning device including a drive system wherein a combination of stepping motors are connected to a single output or drive shaft by gears or other direct driving connection so that the motors rotate in unison with a definite gear ratio existing between each motor and the output shaft. The motors are in turn driven by electrical drive signals which are applied thereto to produce rotation of the motors at speeds related to the gear ratios so that each motor tends to drive the output shaft at the same speed. The motors have different torque versus stepping rate characteristics and are arranged so that a motor with a low maximum stepping rate is connected with the single drive shaft through such a gear ratio and is energized in such a manner as to reach its maximum stepping rate before another motor with a higher maximum stepping rate. The motor having the higher reflected stiffness provides the torque and precision required for moving the drive shaft and attached part at low speeds, and the motor having the lower reflected stiffness but higher maximum speed produces the torque for driving the drive shaft and attached part at higher speeds. Although only two motors are shown and described herein the invention is not necessarily limited to only two motors and if desired three or more motors or groups of motors of different sizes and characteristics drivingly connected and energized in the proper manner may be used.

BRIEF DESCRIPTION OF THE DRAWINGS

FIG. 2 is a graph illustrating the maximum torque versus stepping rate characteristics for the two motors of FIG. 1.

FIG. 3 is a graph illustrating the torque versus drive shaft displacement for the two motors of FIG. 1 during low speed operation.

FIG. 4 is a graph similar to FIG. 2 but showing the torque versus drive shaft displacement relationships during high speed operation.

FIG. 5 is a schematic diagram of another part positioning system embodying the present invention.

DESCRIPTION OF THE PREFERRED EMBODIMENTS

Figure 1:
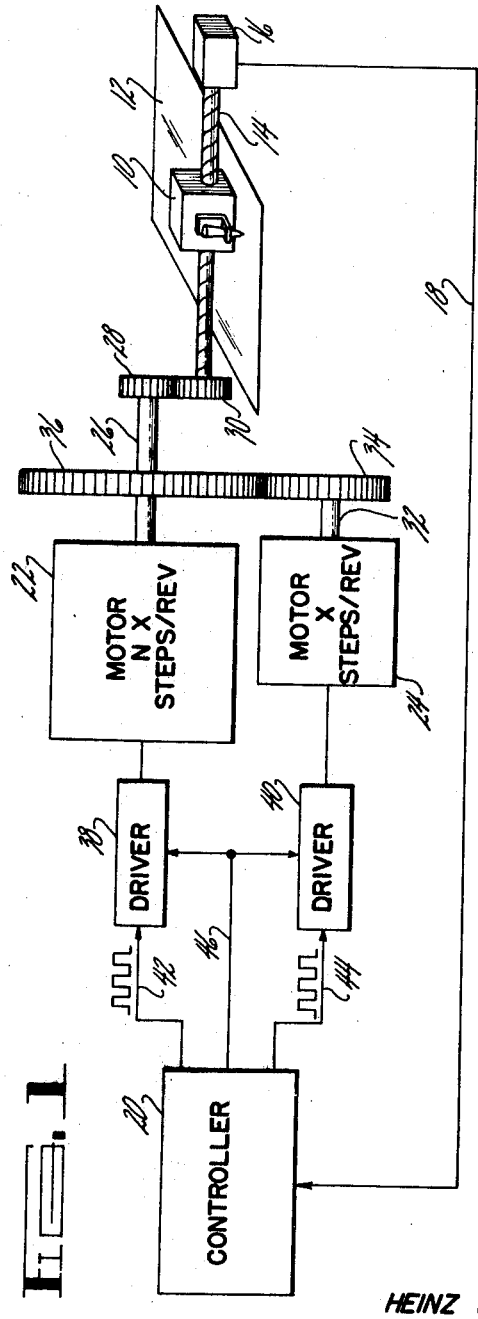
FIG. 1 is a schematic diagram of a part positioning device embodying the present invention.

When the stator windings of a stepping motor are energized a magnetic field is created which attracts the rotor toward a given neutral position relative to the stator. The torque delivered by the rotor is related to the angular displacement error between this neutral position and the actual rotor position. The motor may be considered to have an effective magnetic spring between its stator and its rotor tending to pull the rotor toward the neutral position and with the torque produced being related to the displacement of this spring. With each step of the motor the energization of the stator windings is changed to angularly shift the magnetic field. At the beginning of each step the effect therefore is that of stretching the magnetic spring and thereafter the rotor responds by moving under the influence of the force exerted thereon by the magnetic spring with the potential energy of the spring being converted into a change in the kinetic energy of the rotor and the moving components connected thereto. The movement is in fact substantially the same as that of the classic spring-mass-damper system with the rotor undergoing a series of vibrations as it approaches the new position dictated by the shift of the magnetic field. That is, the rotor in moving to the new position first overshoots this position and then vibrates about it until its movement is damped by the inherent damping of the system.

The movement of the rotor is transmitted directly to the part moved thereby, and in order to provide little overshoot error in the positioning of the driven part it is evident that the effective spring constant or stiffness of the motor, at least as seen by the moved part, must be relatively high. This stiffness may be obtained by connecting a stepping motor to the driven part through gears or other positive driving means so that a given movement of the rotor results in a reduced movement of the part, thereby magnifying the stiffness of the motor as reflected to the part. This, however, limits the speed at which the part may be driven since higher stepping rates are required to move the part at a given rate of speed and as the stepping rate is increased the available torque of the motor soon falls to an unsatisfactory low level.

FIG. 1 shows a part positioning device employing a stepping motor drive which is capable of operating satisfactorily at both high and low rates of movement of the driven part. In FIG. 1, the illustrated device constitutes a plotter having a pen carriage 10 driven in one direction or axis relative to a piece of paper or the like 12 by a lead screw 14. Connected with the lead screw 14 is an encoder 16 which through the line 18 supplies signals to an associated controller 20 representative of the actual position of the carriage 10 in the direction of movement corresponding to the lead screw 14.

The drive motor system for the pen carriage 10 comprises two stepping motors 22 and 24. The motor 22 includes an output shaft 26 which is directly connected with the lead screw 14 by suitable gearing represented by the gears 28 and 30. The gears 28 and 30 are shown to be of the same size so that a given angular movement of the drive shaft 26 results in the same amount of angular movement of the lead screw 14. The second stepping motor 24 includes an output shaft 32 and is drivingly connected with the output shaft 26 of the first motor by two gears 34 and 36, the gear 34 being fixed to the shaft 32 and the gear 36 being fixed to the shaft 26.

The stepping motors 22 and 24 are energized by associated drivers 38 and 40, respectively. Each driver has an input line 42 or 44 on which electrical pulses appear, and the driver operates to change the energization of the associated motor in response to the receipt of each pulse to step the motor one step. Each driver also has an input derived from a line 46 which controls the direction in which the sequence of energization of the associated motor is changed to control the direction in which the motor moves. That is, the signals appearing on the line 46 are direction signals and condition the associated drivers 38 and 40 to control the direction in which the motors 22 and 24 are stepped. The electrical pulses which appear on the driver input lines 42 and 44 are produced by the controller 20 which may take any suitable form. The controller, for example, may be a numerically controlled unit operating from a punched paper tape or magnetic tape input providing information as to the end points of line segments along which the pen carriage 10 is to be moved. At the beginning of each segment such a controller compares the actual position of the pen carriage 10, as provided by the signal from the encoder 16, with the commanded position provided by the input device and produces the required number of pulses on the lines 42 and 44 necessary to effect movement of the pen carriage to the commanded end point. In any event, the pulses which appear on the line 42 occur substantially simultaneously with the pulses which appear on the line 44 and for any given desired movement the total number of pulses applied to the line 42 is equal to the total number of pulses applied to the line 44 with the result that the motor 22 undergoes the same number of steps as the motor 24.

The motors 22 and 24 are motors of dissimilar characteristics. First, the motor 22, which may be referred to as a slow motor, is one which requires a large number of steps to produce one revolution of its output shaft.

The motor 24, which may be referred to as a fast motor, requires a smaller number of steps to produce one revolution of its output shaft 32. As shown in FIG. 1, if the motor 24 requires X steps per revolution of its shaft 32 then the motor 22 is one which requires NX steps per revolution of its output shaft 26, where N is a number larger than 1. In turn, the gears 32 and 36 connecting the two motors are so related to one another that the ratio of the speed ratios between each motor and the single output shaft 26 is equal to the ratio of the steps per revolution of the two motors so that each motor tends to drive the shaft 26 at the same speed. Thus, in the illustrated case the speed ratio between the motor 22 and the shaft 26 is 1 and the speed ratio between the motor 24 and the shaft 26 is N so that the ratio of these two ratios is N. In the system of FIG. 1, N is equal to 2.

Preferably, the fast motor 24 is a motor wherein the rotor undergoes a full step with each change in the stator winding energization and the slow motor 22 is a motor which undergoes a fraction of a full step of movement with each change in stator winding energization. A full step in this instance may be defined as the degree of rotor movement obtained by switching the energization of the stator windings so that two electrically adjacent stator windings are switched from a state where the first is fully on and the second fully off to a state where the first is fully off and the second fully on. Fractional steps are steps obtained, as described for example in my copending application entitled Fractional Step Stepping Motor, when the winding energization is changed in a sequence wherein a number of changes are made between each full step.

The maximum available torque versus stepping rate of the motors 22 and 24 also differ from one another as shown in FIG. 2. In FIG. 2 the maximum torque versus stepping rate characteristic of the motor 22 is shown by the line 22a and the corresponding characteristic for the motor 24 is shown by the line 24a. From this figure it will be noted that the motor 22a is capable of delivering a substantial amount of torque at a much greater stepping rate then is the motor 24a. The illustrated motor 24 at low speeds or stepping rates has a maximum torque approximately one half that of the motor 22, however because of the gear ratio between the motor 24 and the shaft 26 this torque is magnified by a factor of two so that as seen by the shaft 26 each motor has approximately the same maximum available torque. This matching of the torque is not necessary and the motors may be chosen so that at low speeds one or the other has a greater available maximum torque as seen by the output shaft. Nevertheless, FIG. 2 does illustrate the fact that the maximum available torque of the motor 24 may be less than the maximum available torque of the motor 22 and therefore the motor 24 may generally be one of a substantially smaller size than the motor 22.

The operation of the device shown in FIG. 1 may best be understood by considering this figure along with FIGS. 3 and 4. FIG. 3 shows the torque versus displacement error characteristics of the two motors and of the composite drive system during slow speed operation, and FIG. 4 shows the same characteristics during high speed operation. In FIGS. 3 and 4 the dashed line 22b represents the torque versus displacement error characteristic of the slow speed motor 22, the broken line 24b represents the same characteristic of the rotor 24 and the solid line 48 represents the same characteristic of the composite drive system made up of the two motors 22 and 24. The values plotted along the horizontal axis represent the displacement of the single output shaft 26 from the neutral position toward which it is urged by the energization of the two motors. The degrees are electrical degrees rather than mechanical degrees and are referred to the motor 22. The values plotted along the vertical axis represent values of torque as measured at the output shaft 26.

From FIG. 3, it will be noted that when the motors are running at low speed, as represented by this figure, the characteristic curve 24b is quite steep for relatively small angular displacements such as those displacements falling between the two vertical dashed lines 50, 50. The composite characteristic 48 is obtained by adding the two characteristics 22b and 24b and in the region of small angular displacements, the composite characteristic 48 is quite steep indicating that the stiffness or inherent magnetic spring constant of the composite drive system, as reflected to the single output shaft 26, is quite large. The principal contributor to this stiffness of the composite characteristic is the motor 24. Therefore it will be seen that during low speed operation the fast motor 24 acts to provide a high degree of stiffness and detenting action to cause the drive system to locate the driven part relatively accurately and with little overshoot or vibration despite the fact that a relatively large amount of torque is required to move the part because of it generally being accelerated or decelerated at this speed.

In referring to FIG. 4, which shows the motor characteristics at high speed operation it will be noted that at this speed of operation the maximum available torque of the fast motor 24, as represented by the characteristic 24b, has fallen off to about one-fourth of its original value. Nevertheless, the slow motor 22, as represented by the characteristic 22b, retains substantially the same maximum torque as at low speed operation, and when the characteristics 22b and 24b are combined to obtain the composite characteristic 48 it will be noted that in the region of small displacement errors the composite characteristic still has a relatively steep slope between the lines 50, 50 and has a maximum available torque substantially greater than the maximum available torque of the motor 24. More particularly, it will be noted that were the motor 24 used by itself the maximum torque available would be the torque $T_1$, whereas by combining the two motors the maximum torque available, within the region of small displacement errors, is the torque $T_2$ which is substantially higher than the torque $T_1$. The principal contributor to the higher maximum torque $T_2$ is the motor 22 and therefore it can be seen that the motor 22 serves to assure the necessary driving torque at high speed.

In the operation of the composite drive system shown in FIG. 1 there is a smooth transition of control from the fast motor 24 to the slow motor 22 as the stepping rates are increased and torque is lost by the fast motor 24. It should also be noted that as the stepping rates are increased various sub-harmonics of the fundamental frequency of the entire moving system are traversed and the system is excited according to the fairly large spectral content of the excitation at the fundamental frequency. The high stiffness or spring constant of the composite motor system, however, limits the error or overshoot swings at these frequencies. Once the stepping rate passes the fundamental system frequency, the excitation does not contain significant energy at the fundamental frequency of the system and consequently at high stepping rates the inertia and spring constant of the system act as a low-pass filter to reduce the overshoot error. When low stepping rates are produced during the subsequent slow down of the system the torque of the fast speed motor 24 becomes predominant and the accuracy of the system is maintained by the high spring constant and detenting action provided by this motor.

It will be obvious that various different arrangements of motors may be used to practice this invention and if desired more than two motors or groups of motors may be utilized to extend the technique over a wider range of stepping rates. FIG. 5, for example shows an alternate embodiment of the invention wherein two motors 52 and 54 are arranged with the output shaft 56 of the motor 52 in line with and directly connected to the output shaft 58 of the motor 54 so that both motors rotate in unison at the same speed. The shaft 56 of the motor 52 is in turn connected to a driven part, the pen carriage 10, through the same means as illustrated in FIG. 1. Parts which are identical to those in FIG. 1 have been given the same reference numerals as in FIG. 1 and need not be redescribed. The motor 52 is a stepping motor requiring a given number of steps per revolution and the motor 54 is a stepping motor requiring a larger number of steps per revolution with the number of steps per revolution required by the motor 54 being an integral multiple of the number of steps required per revolution by the motor 52. Therefore, if the motor 52 requires X steps per revolution, then the motor 54 requires NX steps per revolution, where N is a whole number. In the case illustrated by FIG. 5 the motor 54 requires twice the number of steps per revolution as the motor 52.

The controller 20 associated with the motors 52 and 54 in FIG. 5 operates to supply driving pulses to the associated drivers 60 and 62, respectively, at rates related to one another by the ratio N so that the motors are excited to operate at the same speed. That is, the driver 60 of the motor 62 is energized by a pulse train 64, appearing on the line 66, having half the number of pulses as the pulse train 68 which appears on the line 70 and energizes the driver 62, the motor 52 therefore being stepped at half the rate of the motor 54. In this combination the motor 52 acts similarly to the fast motor 24 of the FIG. 1 device and the motor 52 acts similarly to the slow motor 22 of the FIG. 1 device. That is, at slow speeds of the output shaft 56 the slow speed motor 54 operates to provide high torque and stiffness to drive the driven part 10 with precision and little overshoot. Since this motor is driven at a high stepping rate, however, its available torque falls off to an unsatisfactory low point as high stepping rates are reached, but at this point the slower speed motor 52 which is driven at a lower stepping rate operates to provide the necessary torque required for the higher speed operation.

What is claimed is:

1. A device employing a plurality of stepping motors for positioning a part with precision relative to a reference member over a wider speed range than possible with a single stepping motor of generally similar characteristics, said device comprising a part supported for movement relative to said reference member, a rotatable drive member, drive means for moving said part relative to said reference member in response to rotation of said drive member, at least two stepping motors, means for energizing said motors so as to run at speeds having a fixed motor speed ratio to one another, and connecting means positively drivingly connecting said motors to one another and to said drive member so as to provide a fixed speed ratio between each of said motors and said drive member and with the ratio of said speed ratios between said motors and said drive member being equal to said fixed motor speed ratio with the result that each of said motors tends to drive said drive member at the same speed, the first of said motors as seen by said drive member having at low speeds of said drive member and within a region of small displacement error a relatively high stiffness, the second of said motors as seen by said drive member having at said low speeds of said drive member and within said region of small displacement error a relatively lower stiffness than said first motor, said first and second motors also having different available torque versus drive member speed characteristics which are such that as the speed of said drive member is increased beyond a given speed greater than said low speeds the stiffness of said second motor as seen by said drive member and within said region of small displacement error becomes greater than the stiffness of said first motor.

2. A part positioning device as defined in claim 1 further characterized by said two stepping motors including one which is operated so as to require X steps to complete one revolution of its rotor and another one which is operated so as to require NX steps to complete one revolution of its rotor, where N is a number larger than one, said means for energizing said motors being effective to step them at equal rates with the result that said ratio of the speeds of said motors is equal to N, and said connecting means being such that the ratio of said speed ratios between said motors and said drive member is equal to N.

3. A part positioning device as defined in claim 1 further characterized by said motors including a first motor which is operated so as to require X steps to complete one revolution of its rotor and a second motor which is operated so as to require NX steps to complete one revolution of its rotor, said connecting means comprising means restraining said motors to rotate in unison at the same speed, and said means for energizing said motors comprising means for changing the energization of said first motor at a rate of X steps per time unit and for changing the energization of said second motor at the rate of NX steps per same time unit.

4. A device for positioning a part as defined in claim 1 further characterized by said drive means including a lead screw drivingly connected with said rotatable drive member and with said part for moving said part relative to said reference member in response to rotation of said drive member.

5. A device for positioning a part as defined in claim 4 further characterized by said device comprising a plotter and said part comprising a carriage carrying an instrument for marking said reference member.

6. A dive motor system employing a plurality of stepping motors and capable of positioning a driven part with precision over a wider speed range than possible with a single stepping motor of generally similar characteristics, said system comprising at least two stepping motors, means for energizing said motors so as to run at speeds having a fixed motor speed ratio to one another, a common rotatable drive member, and connecting means positively drivingly connecting said motors to one another and to said drive member so as to provide a fixed speed ratio between each of said motors and said drive member and with the ratio of said speed ratios between said motors and said drive member being equal to said fixed motor speed ratio with the result that each of said motors tends to drive said drive member at the same speed, the first of said motors as seen by said drive member having at low speeds of said drive member and within a region of small displacement error a relatively high stiffness, the second of said motors as seen by said drive member having at said low speeds of said drive member and within said region of small displacement error a relatively lower stiffness than said first motor, said first and second motors also having different available torque versus drive member speed characteristics which are such that as the speed of said drive member is increased beyond a given speed greater than said low speeds the stiffness of said second motor as seen by said drive member and within said region of small displacement error becomes greater than the stiffness of said first motor.

7. A drive motor system comprising at least two stepping motors and including a first motor which is operated so as to require X steps to complete one revolution of its rotor and a second motor which is operated so as to require NX steps to complete one revolution of its rotor, where N is a number larger than one, a common rotatable drive member, connecting means positively drivingly connecting each of said motors with said common drive member with said first motor having a different speed ratio with respect to said drive member than the speed ratio of said second motor with respect to said drive member, and means for energizing said motors at such stepping rates that they tend to drive said drive member at the same speed.

8. A drive motor system as defined in claim 7 further characterized by said connecting means being such that the ratio of the speed ratios between said motors and drive member is equal to N, and said means for energizing said motors being such that both of said motors are stepped at the same rate.

9. A drive motor system employing a plurality of stepping motors and capable of positioning a driven part with precision over a wider speed range than possible with a single motor of generally similar characteristics, said system comprising at least two stepping motors including a first motor which is operated so as to require X steps to complete one revolution of its rotor and a second motor which is operated so as to require NX steps to complete one revolution of its rotor, where N is a number larger than one, a common drive member, connecting means drivingly connecting said motors to one another and to said drive member and restraining said motors to rotate in unison at the same speed, and means for energizing said motors so that the energization of said first motor is changed at a rate of X steps per time unit and the energization of said second motor is changed at the rate of NX steps per same time unit 10. A drive motor system for driving a given rotatable drive member, said system comprising first and second stepping motors, means positively drivingly connecting each of said first and second stepping motors to said drive member, and means for energizing said first and second stepping motors so that each tends to drive said drive member at the same instantaneous speed over a range of varying speeds, said first and second motors and said connecting means for each of said motors being such that at low speeds of said drive member said first motor as seen by said drive member has a greater stiffness than said second motor and that at higher speeds of said drive member said second motor as seen by said drive motor has a greater stiffness than said first motor.

References Cited

UNITED STATES PATENTS

| | | | |
|---|---|---|---|
| 608,249 | 8/1898 | Bradley | 318—46 |
| 1,753,331 | 4/1930 | Clokey | 318—47 |
| 2,523,503 | 9/1950 | Fairbanks | 318—8 |
| 2,696,578 | 12/1954 | Newell | 318—46 X |
| 2,765,433 | 10/1956 | Lilienstein | 318—46 |
| 2,830,246 | 4/1958 | Thomas | 318—46 |
| 3,146,386 | 8/1964 | Gerber | 318—8 |
| 3,268,785 | 8/1966 | Gerber et al. | 318—8 |

THOMAS E. LYNCH, Primary Examiner

U.S. Cl. X.R.

318—18, 46, 138

PO-1050
(5/69)

UNITED STATES PATENT OFFICE
CERTIFICATE OF CORRECTION

Patent No. 3,497,778          Dated February 24, 1970

Inventor(s)    Heinz Joseph Gerber

It is certified that error appears in the above-identified patent and that said Letters Patent are hereby corrected as shown below:

Col. 4, line 42, "then" should read --than--

Col. 7, line 30, "dive" should read --drive--

Col. 8, line 46, "motor" should read --member--

SIGNED AND
SEALED
AUG 25 1970

(SEAL)
Attest:

Edward M. Fletcher, Jr.
Attesting Officer

WILLIAM E. SCHUYLER, JR.
Commissioner of Patents